US009411820B2

(12) United States Patent
Nair et al.

(10) Patent No.: US 9,411,820 B2
(45) Date of Patent: *Aug. 9, 2016

(54) METHODS AND SYSTEMS FOR MODELING A REPLICATION TOPOLOGY

(71) Applicant: CITIGROUP TECHNOLOGY, INC., Weehawken, NJ (US)

(72) Inventors: Sandeep Nair, Odessa, FL (US); Jerry Speyer, Tampa, FL (US); Raj Punuru, Hillsborough, NJ (US)

(73) Assignee: Citigroup Technology, Inc., Weehawken, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/732,351

(22) Filed: Jun. 5, 2015

(65) Prior Publication Data

US 2015/0269184 A1      Sep. 24, 2015

Related U.S. Application Data

(63) Continuation of application No. 13/624,057, filed on Sep. 21, 2012, now Pat. No. 9,081,840.

(51) Int. Cl.
*G06F 17/00* (2006.01)
*G06F 17/30* (2006.01)
*G06F 17/16* (2006.01)

(52) U.S. Cl.
CPC .... *G06F 17/30215* (2013.01); *G06F 17/30575* (2013.01); *G06F 17/16* (2013.01)

(58) Field of Classification Search
CPC ............... G06F 17/30215; G06F 17/30575

USPC .................................................. 707/634, 639
See application file for complete search history.

(56) References Cited

U.S. PATENT DOCUMENTS

| | | | |
|---|---|---|---|
| 5,276,868 A * | 1/1994 | Poole | G06F 17/30327 707/693 |
| 5,832,225 A | 11/1998 | Hacherl et al. | |
| 6,980,985 B1 | 12/2005 | Amer et al. | |
| 7,174,540 B2 * | 2/2007 | Ondrusek | G06F 8/71 717/120 |
| 7,519,736 B2 | 4/2009 | Parham | |

(Continued)

FOREIGN PATENT DOCUMENTS

WO    WO2010029540 A1    9/2009

OTHER PUBLICATIONS

Cui, "LDAP Directory Template Model on Multi-Master Replication", IEEE Asia-Pacific Services Computing Conference, Dec. 6, 2010, 479-484.

(Continued)

*Primary Examiner* — Phong Nguyen
(74) *Attorney, Agent, or Firm* — John M. Harrington, Esq.; Johnson, Marcou & Isaacs, LLC

(57) ABSTRACT

Methods and systems for modeling a replication topology involve, for example, representing a plurality of replication components of a replication topology in a first binary matrix using a processor coupled to memory and generating a result matrix based at least in part on the first binary matrix likewise using the processor. Thereafter, also using the processor, replication components of the replication topology may be identified that are either enabled or non-enabled to receive replications from other replication components of the replication topology based at least in part on the result matrix.

17 Claims, 3 Drawing Sheets

(56) References Cited

U.S. PATENT DOCUMENTS

| | | | |
|---|---|---|---|
| 7,526,513 B2 | 4/2009 | Lees et al. | |
| 7,540,012 B1* | 5/2009 | Herzberg | H04N 21/2405 |
| | | | 209/212 |
| 7,584,174 B2 | 9/2009 | Blanco et al. | |
| 8,037,023 B2 | 10/2011 | Liu et al. | |
| 8,045,486 B2 | 10/2011 | Swan | |
| 8,190,561 B1 | 5/2012 | Poole et al. | |
| 8,271,336 B2 | 9/2012 | Mikurak | |
| 2001/0042139 A1* | 11/2001 | Jeffords | G06F 9/5016 |
| | | | 719/316 |
| 2003/0065686 A1* | 4/2003 | Callahan | G06F 9/526 |
| | | | 707/999.2 |
| 2004/0255272 A1* | 12/2004 | Ondrusek | G06F 8/71 |
| | | | 717/120 |
| 2007/0156889 A1* | 7/2007 | Bhrara | G06F 9/5027 |
| | | | 709/224 |
| 2008/0270596 A1* | 10/2008 | Wahl | G06F 17/30575 |
| | | | 709/224 |
| 2009/0282039 A1* | 11/2009 | Diamond | G06F 17/30985 |
| | | | 707/E17.014 |
| 2011/0131288 A1 | 6/2011 | Patel | |
| 2011/0153563 A1* | 6/2011 | Fitterer | G06F 17/30581 |
| | | | 707/623 |
| 2011/0252124 A1 | 10/2011 | Bonner et al. | |
| 2012/0005160 A1 | 1/2012 | Naicken et al. | |
| 2012/0026917 A1 | 2/2012 | Guo et al. | |
| 2012/0317079 A1* | 12/2012 | Shoens | G06F 17/30215 |
| | | | 707/639 |

OTHER PUBLICATIONS

Fadelelmoula, et al., "A Binary Replication Strategy for Large-Scale Mobile Environments", International Journal of Computer Science and Security, vol. 3, No. 2, 2009, pp. 83-104.

ip.com, et al., "Method of Replicating Password Policy Operational Attributes from Read-Only Replicas", IP.Com Prior Art Database. IPCOM000219073D, Jun. 19, 2012, pp. 1-4.

Nguyen, Office Action, Sep. 30, 2014, 15 pages.

Thomas, International Search Report and Written Opinion for PCT/US13/44234, Dec. 13, 2013, 12 pages.

* cited by examiner

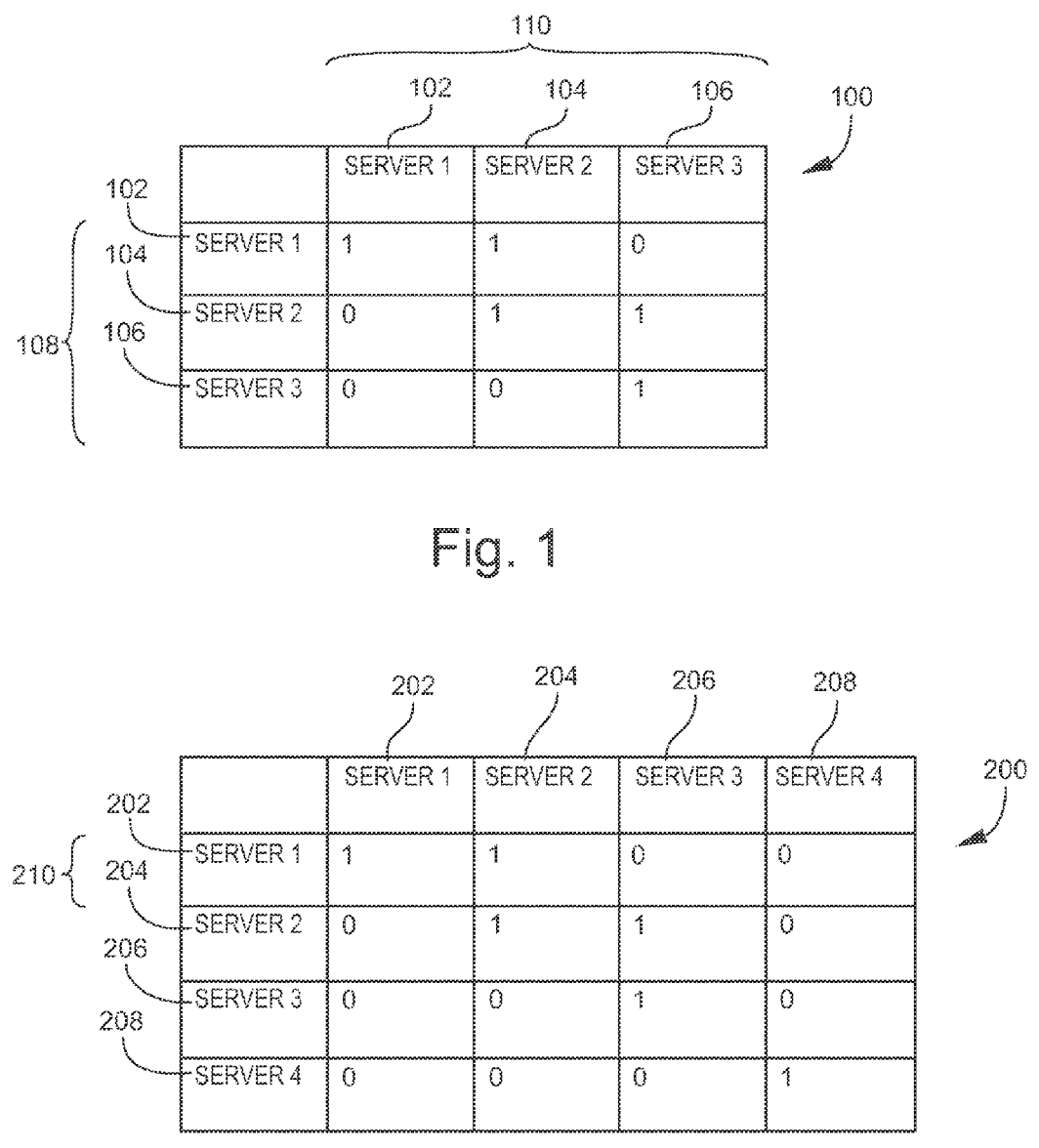

|         | SERVER 1 | SERVER 2 | SERVER 3 |
|---------|----------|----------|----------|
| SERVER 1 | 1 | 1 | 0 |
| SERVER 2 | 0 | 1 | 1 |
| SERVER 3 | 0 | 0 | 1 |

Fig. 1

|         | SERVER 1 | SERVER 2 | SERVER 3 | SERVER 4 |
|---------|----------|----------|----------|----------|
| SERVER 1 | 1 | 1 | 0 | 0 |
| SERVER 2 | 0 | 1 | 1 | 0 |
| SERVER 3 | 0 | 0 | 1 | 0 |
| SERVER 4 | 0 | 0 | 0 | 1 |

Fig. 2

|         | SERVER 1 | SERVER 2 | SERVER 3 | SERVER 4 |
|---------|----------|----------|----------|----------|
| SERVER 1 | 1 | 1 | 0 | 0 |
| SERVER 2 | 0 | 1 | 1 | 0 |
| SERVER 3 | 0 | 0 | 1 | 1 |
| SERVER 4 | 0 | 0 | 0 | 1 |

Fig. 3

METHODS AND SYSTEMS FOR MODELING A REPLICATION TOPOLOGY

PRIORITY APPLICATION

This application is a continuation of co-pending U.S. patent application Ser. No. 13/624,057 filed Sep. 21, 2012, entitled "Methods and Systems for Modeling a Replication Topology", which is incorporated herein by this reference.

FIELD OF THE INVENTION

The present invention relates generally to the field of computer modeling, and more particularly to methods and systems for modeling a replication topology, such as a Lightweight Directory Access Protocol (LDAP) server infrastructure.

BACKGROUND OF THE INVENTION

Typically, an LDAP infrastructure of a global enterprise, such as the single sign-on LDAP infrastructure, may be very large. For example, such an infrastructure may include 30 to 100 servers. Such a global enterprise may experience serious issues relating to LDAP server topology from time-to-time. For example, an outage in one LDAP server in the infrastructure may lead to an outage in another part of the infrastructure because an update does not reach servers in such other part of the infrastructure and such servers therefore become 'orphaned'. Thus, it is important to know in advance what the impact would be if a server is removed from the infrastructure.

When the LDAP infrastructure is in the process of being designed, it is very difficult to determine whether or not a proposed server topology is fully matched in the sense that every server connects to every other server in the server topology. Thus, there is currently no suitable way to determine how well a particular server topology will perform, whether all the servers in the topology are receiving updates from multiple sources, and what problems may arise with the topology in the event one or more servers become orphaned. In a small infrastructure, for example, with less than four servers, it is quite easy to manually determine the quality of the server topology. However, as the number of servers increases, that task becomes increasingly complex.

There is a current need for an accurate model that allows designers to determine whether or not a proposed server topology will perform well in a production scenario and also provides the enterprise with guidelines for when an occasion may arise when it becomes necessary to take down one or more servers in the topology.

SUMMARY OF THE INVENTION

Embodiments of the invention employ computer hardware and software, including, without limitation, one or more processors coupled to memory and non-transitory computer-readable storage media with one or more executable programs stored thereon which instruct the processors to perform the replication topology modeling described herein. Embodiments of the invention provide methods and systems for modeling a replication topology that may involve, for example, representing, using a processor coupled to memory, a plurality of replication components of a replication topology in a first binary matrix; generating, using the processor, a result matrix based at least in part on the first binary matrix; and identifying, using the processor, replication components of the replication topology that are enabled to receive replications from other replication components of the replication topology based at least in part on the result matrix.

In an aspect of embodiments of the invention, representing the plurality of replication components may involve, for example, representing the plurality of replication components as both supplier components and consumer components in the first binary matrix. In another aspect, representing the plurality of replication components as both supplier and consumer components may involve, for example, representing the plurality of replication components as supplier components in rows of the first binary matrix and as consumer components in columns of the first binary matrix. In a further aspect, the first binary matrix may comprise, for example, a plurality of cells defined by the respective rows and columns of the first binary matrix, and wherein a cell value equal to one represents a connection between a supplier component in a row and a consumer component in a column that together define the cell.

In an additional aspect of embodiments of the invention, representing the plurality of replication components may involve, for example, representing the plurality of replication components of a replication topology in the first binary matrix of a size N×N, where N is the number of replication components in the replication topology. In another aspect, the plurality of replication components may comprise, for example, a plurality of servers of a server infrastructure. In still another aspect, the plurality of servers may comprise, for example, a plurality of servers of a Lightweight Directory Access Protocol (LDAP) infrastructure.

In a further aspect of embodiments of the invention, generating the result matrix may involve, for example, generating the result matrix as a product of the first binary matrix and a one-row binary matrix representing one of the plurality of replication components of the replication topology as a supplier component. In another aspect, generating the result matrix may involve, for example, generating the result matrix according to an equation: $M_{Result} M*M_{Row}$, where $M_{Result}$ is the result matrix, M is the first binary matrix, and $M_{Row}$ is the one-row matrix representing one of the plurality of replication components. In an additional aspect, the result matrix may comprise, for example, a one-row result matrix.

In a still further aspect of embodiments of the invention, generating the result matrix may involve, for example, generating the result matrix as a product of the first binary matrix multiplied by itself. In another aspect, generating the result matrix may involve, for example, generating the result matrix according to an equation: $M_{Result}=M*M$, where $M_{Result}$ is the result matrix and M is the first binary matrix. In an additional aspect, the first binary matrix may comprise, for example, a binary matrix of size N×N, where N is a number of replication components in the replication topology, and the result matrix is likewise a matrix of size N×N.

In still another aspect of embodiments of the invention, generating the result matrix may involve, for example, generating the result matrix by multiplying the first binary matrix by itself and iteratively multiplying the first binary matrix by an outcome matrix and by each of a plurality of succeeding outcome binary matrices for a pre-determined number of iterations. In a further aspect, the result matrix may comprise, for example, a matrix of size N×N, where N is a number of replication components in the replication topology. In a still further aspect, generating the result matrix may involve, for example, iteratively multiplying the first binary matrix by the outcome matrix and by each of the plurality of succeeding outcome binary matrices for a pre-determined number of iterations equal to N minus two iterations.

In an additional aspect of embodiments of the invention, identifying replication components of the replication topology that are enabled to receive replications from other replication components may involve, for example, identifying cells defined by respective rows of the result matrix representing the plurality of replication components as supplier components and columns of the result matrix representing the plurality of replication components as consumer components having cell values equal to one. Another aspect may involve, for example, identifying replication components of the replication topology that are non-enabled to receive replications from other replication components as cells defined by respective rows of the result matrix representing the plurality of replication components as supplier components and columns of the result matrix representing the plurality of replication components as consumer components having cell values equal to zero.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

BRIEF DESCRIPTION OF THE DRAWINGS

FIG. 1 illustrates an example of a representation in a binary matrix for embodiments of the invention of a replication topology having three servers in which server one replicates to server two and server two replicates to server three;

FIG. 2 illustrates an example of a representation in a binary matrix for embodiments of the invention of a replication topology having four servers in which server one replicates to server two and server two replicates to server three;

FIG. 3 illustrates an example of a representation in a binary matrix for embodiments of the invention of another replication topology having four servers in which server one replicates to server two and server two replicates to server three, which in turn replicates to server four.

DETAILED DESCRIPTION

Figure 4:
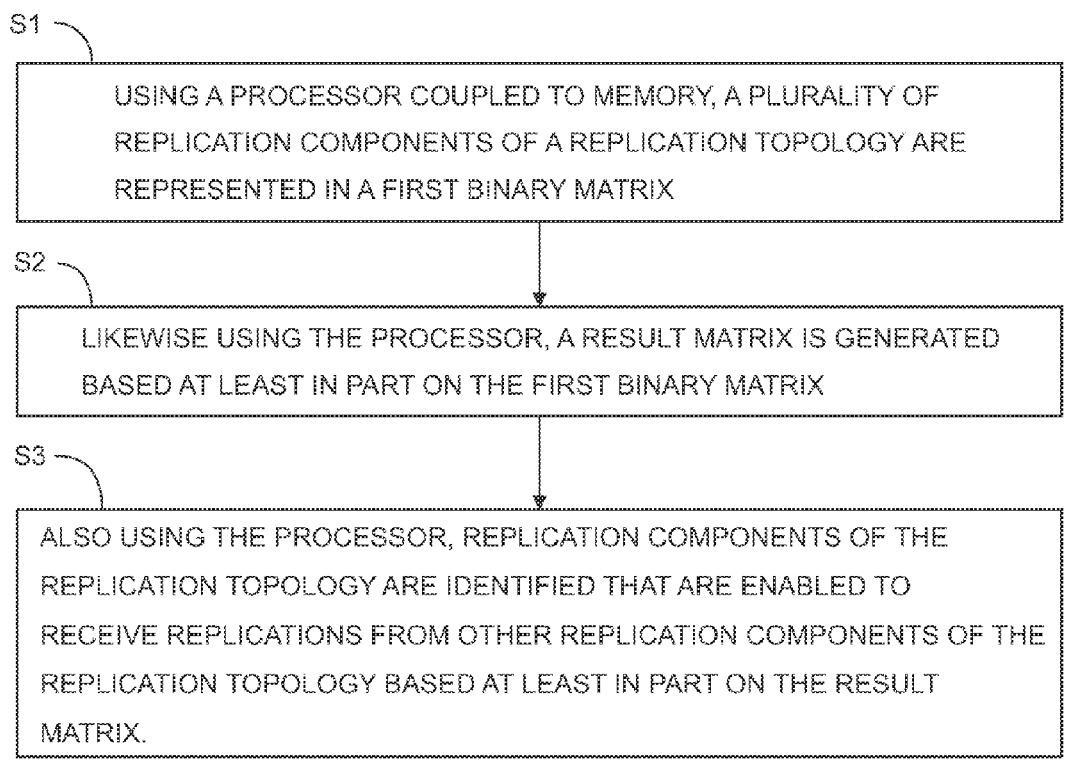
FIG. 4 is a flow chart that illustrates an overview example of the process of modeling a replication topology for embodiments of the invention.

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention cover such modifications and variations that come within the scope of the invention. It is to be understood the discussion herein of servers as replication components is exemplary and is not intended to limit the scope of the present invention and that embodiments of the invention include any and all types of replication components and replication component topologies.

Embodiments of the invention provide methods and systems for modeling a replication topology which can be used, for example, with any number of servers. As previously mentioned, while it is possible to manually assess a server topology having a small number of servers, such as less than four servers, as a practical matter, it is virtually impossible to manually assess a server topology having a large number of servers, such as 10 to 30 or more servers. The model for embodiments of the invention may be used to assess server topologies of any size, but the model becomes increasingly useful as the number of servers increases.

In an LDAP environment with a topology that includes a large number of servers, it may be possible to determine the potential impact of taking down a particular server by actually taking down the server to assess the result. However, actually taking down a server in such a topology to see what outages may be caused is at best an ineffective way to attempt to assess the server topology, since the ultimate objective is to avoid such outages. It is simply not practical to attempt to manually check whether or not updates reach all nodes of a large server topology.

Embodiments of the invention provide a mathematical model that simulates the effects in a server infrastructure of taking down various servers. In an aspect, the model may be said to be analogous to simulating the effects of turning various servers in the server infrastructure off and on. Embodiments of the invention represent this aspect as a binary matrix depicting replication between servers from rows to columns. In the model for embodiments of the invention, the mathematical matrix is created in which a cell value of one depicts replication from a server in a row of supplier servers to a server in a column of consumer servers that defines the cell. Conversely, a server in the column of consumer servers receives the replication updates from a server in the row of supplier servers. Consequently, in such matrix the diagonal cell values are all one, indicating that all servers replicate to themselves. Thus, embodiments of the invention convert the server topology into a matrix wherein the same servers are illustrated in both the rows and the columns.

FIG. 1 illustrates an example of a representation in a binary matrix 100 for embodiments of the invention of a replication topology having three servers 102, 104, and 106. In the matrix 100 of FIG. 1, server one 102 replicates to server two 104 and server two 104 replicates to server three 106. Referring to FIG. 1, each cell may represent a replication agreement, depending on whether the number in the particular cell is a zero, which indicates replication is not enabled or a one, which indicates that replication is enabled, between two servers. The direction in which replication proceeds is always from a row 108 to a column 110. Thus, a server 102, 104, or 106 on the row 108 replicates to a server 102, 104, or 106 in the column 110 if the number in the cell is one. As noted above, the number in the diagonal is always one, which means, in effect, that each server 102, 104, 106 in the replication topology replicates to itself.

Embodiments of the invention employ matrix multiplication, which involves multiplying, for example, rows in one matrix by columns in another matrix. Using the matrix multiplication employed in the model for embodiments of the invention, it is possible to determine whether there are any servers in a server topology that are not receiving updates. Referring again to the binary matrix illustrated in FIG. 1, servers one 102, two 104 and three 106 represent three servers in the server topology. It is to be understood that while it is possible to manually assess server topology with such a small number of servers, the model holds true for much larger server topologies. The smaller server topology is used herein to illustrate the principles of embodiments of the present invention for simplicity's sake. Nevertheless, the model yields identical results with much larger server topologies.

The multiplication of matrices for embodiments of the invention may be performed in one step or may be performed aggregatively. As aspect of embodiments of the invention provides a one step analysis for analyzing updates from one server. The one step analysis for analyzing updates from one server involves multiplying the matrix times the first row of the matrix or some other row of the matrix. FIG. 2 illustrates an example of a representation in a binary matrix (M) 200 for embodiments of the invention of a replication topology having four servers 202, 204, 206, and 208. Referring to FIG. 2, server one 202 replicates to server two 204 and server two 204 replicates to server three 206. Referring to the matrix (M) 200 of FIG. 2, a one-row matrix, matrix $M_{1r}$, which is the first row 210 of matrix (M) 200, may be created. The matrix (M) 200 may then be multiplied by the one row matrix $M_{1r}$, consisting of the first row 210 in matrix M, to yield the result matrix $M_{Result}$ as follows:

$$M_{Result} = M_{1r} * M$$

$$M = \begin{matrix} 1 & 1 & 0 & 0 \\ 0 & 1 & 1 & 0 \\ 0 & 0 & 1 & 0 \\ 0 & 0 & 0 & 1 \end{matrix} \text{ and}$$

$$M_{1r} = \begin{matrix} 1 & 1 & 0 & 0 \end{matrix}$$

Therefore, since $M_{Result} = M_{1r} * M$, $$M_{Result} = \begin{matrix} 1 & 1 & 0 & 0 \end{matrix} * \begin{matrix} 1 & 1 & 0 & 0 \\ 0 & 1 & 1 & 0 \\ 0 & 0 & 1 & 0 \\ 0 & 0 & 0 & 1 \end{matrix}$$

Thus, $M_{Result} = \begin{matrix} 1 & 2 & 1 & 0 \end{matrix}$

The resulting matrix $M_{Result}$ above is a single row matrix representing server one 202 with each column representing a server. If a resulting cell value is equal to zero, the server represented by the column of cells is not receiving any updates when server one 202 is updated. Ideally, this result should never occur. A resulting cell value equal to one means that the server represented by the column of cells receives updates indirectly and does not receive a direct update from server one 202. A resulting cell value greater than one is an ideal situation in which the server represented by column of cells receives updates from multiple sources. If the resulting cell value is zero, it would be necessary to investigate to see what problem may have arisen due to the particular server not receiving updates.

In the initial matrix (M), a zero in a cell means the particular servers are not directly connected. Thus, in the initial matrix (M) 100 of FIG. 1, server one 102 replicates to server two 104, server two 104 replicates to server three 106. Server three 106 does not replicate to any other server. In the end, server three 106 receives updates because server one 102 replicates to server two 104, which replicates to server three 106, although server one 102 does not replicate directly to server three 106. This represents a depth of the server infrastructure, and the greater the depth of the infrastructure, the greater the danger that removing a single server may break a link, which can cause several servers to become orphaned.

Referring to the matrix (M) 200 for the topology illustrated in FIG. 2, the replication topology has four servers 202, 204, 206, and 208, with server one 202 replicating to server two 204, which in turn replicates to server three 206. Embodiments of the invention provide a one step analysis of updates from a single server in a topology, such as the topology illustrated in FIG. 2. Based on the foregoing one step analysis for updates from one server, it can be concluded that when server one 202 is updated, servers two 204 and three 206 receive updates, but server four 208 does not receive updates. When a four×four binary matrix, such as the four×four binary matrix (M) 200 of the above example, is multiplied by a one×four matrix, such as the one×four matrix of $M_{1r}$ in the example, the result is a one×four matrix, such as the $M_{Result}$ in the example. Thus, the significance of the final zero in the $M_{Result}$ of the example is that server 208 four receives no updates at all when server one 202 is updated.

While the foregoing example, illustrates a one step analysis of an update from a single server, in the real world, an objective may be to determine whether all servers in a server topology receive an update when any other server is updated. An aspect of embodiments of the invention addresses that objective by providing a one step analysis of updates from any server in a server topology in which the matrix (M) is multiplied by itself. When a four×four matrix, such as the four×four matrix (M) of the above example, is multiplied by itself, the result is a four×four matrix. Thus, in the one step analysis of updates from any server in which the matrix (M) is multiplied by itself, the result matrix $M_{Result}$ is a symmetric matrix of size N×N in which N represents the number of rows and columns. In this aspect, each row of $M_{Result}$ represents the server number that receives updates and, similar to the analysis of updates from a single server, the columns in each row indicate whether the respective server number receives the update. A zero in a cell indicates that the server is orphaned.

In the one step analysis of updates from any single server in the topology of FIG. 2, for example:

$$M = \begin{matrix} 1 & 1 & 0 & 0 \\ 0 & 1 & 1 & 0 \\ 0 & 0 & 1 & 0 \\ 0 & 0 & 0 & 1 \end{matrix}$$

Therefore, since $M_{Result} = M * M$:

$$M_{Result} = \begin{matrix} 1 & 1 & 0 & 0 \\ 0 & 1 & 1 & 0 \\ 0 & 0 & 1 & 0 \\ 0 & 0 & 0 & 1 \end{matrix} * \begin{matrix} 1 & 1 & 0 & 0 \\ 0 & 1 & 1 & 0 \\ 0 & 0 & 1 & 0 \\ 0 & 0 & 0 & 1 \end{matrix}$$

Thus, $M_{Result} = \begin{pmatrix} 1 & 2 & 1 & 0 \\ 0 & 1 & 2 & 0 \\ 0 & 0 & 1 & 0 \\ 0 & 0 & 0 & 1 \end{pmatrix}$ In embodiments of the invention, the result, $M_{Result}$, may be interpreted as follows:

As expected from the earlier one-row matrix example, the first row of the result in the one step analysis of updates from any single server is:

1 2 1 0

This is the same as the first row in the in the foregoing analysis of updates from a single server. Thus, in the first row of the result, the significance of the final zero is that when server one 202 is updated, server four 208 receives no updates. Likewise, in the second row, the significance of the first and final zeros is that when server two 204 is updated, servers one 202 and four 208 receive no updates. In addition, in the third row, the first, second and fourth zeros means that when server three 206 is updated, none of the servers one 202, two 204 or four 208 receives updates. Finally, in the fourth row, the first, second and third zeros likewise indicate that when server four 208 is updated, none of the servers one 202, two 204, or three 206 receives updates. It is to be noted that in the first, second, third and fourth rows, respectively, the first, second, third and fourth ones simply reflect that each of servers one, 202, two 204, three 206, and four 208 replicates to itself. Thus, it can be concluded that in the particular topology, server four 208 will never receive an update when any of any of the other servers 202, 204, and 206 are updated, and none of other servers will ever receive an update when server four is updated.

The foregoing one step analysis of an update from a single server or from any server is limited to nodes that are one level deep. For example, when server one 202 replicates to server two 204, which in turn replicates to server three 206, server three 206 is considered to be one level deep from the update. This is true because there is one server between the source of the update and the target server. In the foregoing one-step analysis of an update from a single server or from any single server, a server that is two levels deep from the update will be missed. However, such multistep replication is present in most larger server topologies. Another aspect of embodiments of the invention provides a multistep, iterative analysis for updates from any server at any level in a server topology.

Such aspect involves, for example, iterating the multiplication of the result, $M_{Result}$ by the matrix, M. In such an iterative process, the result may denoted, $M_{Result-I}$, where I represents the iteration number.

The multistep, iterative analysis for embodiments of the invention is as follows:

$M*M=M_{Result-1}$    Iteration 1:

$M_{Result-1}*M=M_{Result-2}$    Iteration 2:

Thus, the equation for each iteration I is as follows:

$M_{Result-I-1}*M=M_{Result-I}$    Iteration I:

Accordingly, the number of iterations required for a matrix of a size N×N, where N is the number of servers in the replication topology, may be defined by:

$I_{max}=N-2$ where N>2 (N−2 is also the maximum possible depth in a topology)

$I_{max}=0$ where N<3 because a matrix of size one and two requires no analysis since the matrix itself is the result. In such a small infrastructure, one can determine whether there is a problem by simply looking at the matrix.

FIG. 3 shows an example of another binary matrix 300 for a replication topology with four servers 302, 304, 306, and 308, in which server one 302 replicates to server two 304, server two 304 replicates to server three 306, which in turn replicates to server four 308. The multistep, iterative analysis for embodiments of the invention enables a determination to be made of the servers that do not receive updates when any of the servers are updated.

In the case of the foregoing four-server topology, the matrix (M) 300 is:

M equals:

$\begin{pmatrix} 1 & 1 & 0 & 0 \\ 0 & 1 & 1 & 0 \\ 0 & 0 & 1 & 1 \\ 0 & 0 & 0 & 1 \end{pmatrix}$ In iteration 1: $M_{Result-1}=M*M$, as follows:

$\begin{pmatrix} 1 & 1 & 0 & 0 \\ 0 & 1 & 1 & 0 \\ 0 & 0 & 1 & 1 \\ 0 & 0 & 0 & 1 \end{pmatrix}$ $*$ $\begin{pmatrix} 1 & 1 & 0 & 0 \\ 0 & 1 & 1 & 0 \\ 0 & 0 & 1 & 1 \\ 0 & 0 & 0 & 1 \end{pmatrix}$ Thus, $M_{Result-1}$ equals:

$\begin{pmatrix} 1 & 2 & 1 & 0 \\ 0 & 1 & 2 & 1 \\ 0 & 0 & 1 & 2 \\ 0 & 0 & 0 & 1 \end{pmatrix}$ It is to be noted that server four 308 does not receive any updates when server one 302 is updated, but since the present example is a 4×4 matrix, it is necessary to go through ceiling (4−2)=2 iterations. Accordingly, $M_{Result-2}=M_{Result-1}*M$ equals:

$\begin{pmatrix} 1 & 2 & 1 & 0 \\ 0 & 1 & 2 & 1 \\ 0 & 0 & 1 & 2 \\ 0 & 0 & 0 & 1 \end{pmatrix}$ -continued $$\begin{matrix} 1 & 1 & 0 & 0 \\ 0 & 1 & 1 & 0 \\ 0 & 0 & 1 & 1 \\ 0 & 0 & 0 & 1 \end{matrix}$$

Thus, $M_{Result-2}$ equals:

$$\begin{matrix} 1 & 3 & 3 & 1 \\ 0 & 1 & 3 & 3 \\ 0 & 0 & 1 & 3 \\ 0 & 0 & 0 & 1 \end{matrix}$$

Based on the foregoing iteration, it should be noted that the result has changed to reveal that server four 308 does indeed receive updates. It may be concluded from the foregoing computation that all servers 304, 306, and 308 receive updates when server one 302 is updated; that server one 302 will not receive updates when server two 304 is updated; that servers one 302 and two 304 will not receive updates when server three 306 is updated; and that none of servers one 302, two 304, or three 306 will receive updates when server four 308 is updated.

In an ideal world, it would be simpler if depth of updates in a server topology could be limited to one level or less for all servers. However, as a practical matter, cascading replications are generally present in real-life server topologies. As previously noted, the number of iterations required for a matrix of a size N×N, where N is the number of servers in the replication topology, may be defined by $I_{max}=N-2$, where N is greater than two. After performing the number of iterations required for a matrix of a size N×N, $I_{max}$, if the resultant matrix $M_{Imax}$ has no zeros in any cell, it may be concluded that the topology is balanced in that the updates from any server will reach all nodes in the topology. Further, if a non-zero matrix is reached at the Nth iteration before the $I_{max}$ number of iterations, it may be concluded that the replication topology has at least one server that has a depth of N levels. In such a scenario, the server that is last in reaching a non-zero value in its column may be considered to be the weakest link.

FIG. 4 is a flow chart that illustrates an overview example of the process of modeling a replication topology for embodiments of the invention. Referring to FIG. 4, at S1, using a processor coupled to memory, a plurality of replication components of a replication topology are represented in a first binary matrix. At S2, likewise using the processor, a result matrix is generated based at least in part on the first binary matrix. At S3, also using the processor, replication components of the replication topology are identified that are enabled to receive replications from other replication components of the replication topology based at least in part on the result matrix.

The foregoing analysis may be used as a tool for both designing and monitoring a replication topology. Embodiments of the invention provide a way to determine, for example, the weakest link or links in a server infrastructure and whether or not there is a potential problem in the particular server infrastructure. In a real-time scenario, for example, embodiments of the invention may be used to predict what will happen if a particular server is taken down. Thus, embodiments of the invention enable a warning notice to be given to the appropriate personnel of the consequences of taking down the particular server.

In addition, as previously noted, the analyses for embodiments of the invention may have applications in other fields in which replication or replication type phenomenon exists. For example, a social networking site may involve a network of friends who post items from time to time which may be replicated to other friends. For another example, communicable diseases may likewise be replicated from one organism, such as an infected person, to another as a result of physical or some other type of contact.

It is to be understood that embodiments of the invention may be implemented as processes of a computer program product, each process of which is operable on one or more processors either alone on a single physical platform, such as a personal computer, or across a plurality of platforms, such as a system or network, including networks such as the Internet, an intranet, a WAN, a LAN, a cellular network, or any other suitable network. Embodiments of the invention may employ client devices that may each comprise a computer-readable medium, including but not limited to, random access memory (RAM) coupled to a processor. The processor may execute computer-executable program instructions stored in memory. Such processors may include, but are not limited to, a microprocessor, an application specific integrated circuit (ASIC), and or state machines. Such processors may comprise, or may be in communication with, media, such as computer-readable media, which stores instructions that, when executed by the processor, cause the processor to perform one or more of the steps described herein.

It is also to be understood that such computer-readable media may include, but are not limited to, electronic, optical, magnetic, RFID, or other storage or transmission device capable of providing a processor with computer-readable instructions. Other examples of suitable media include, but are not limited to, CD-ROM, DVD, magnetic disk, memory chip, ROM, RAM, ASIC, a configured processor, optical media, magnetic media, or any other suitable medium from which a computer processor can read instructions. Embodiments of the invention may employ other forms of such computer-readable media to transmit or carry instructions to a computer, including a router, private or public network, or other transmission device or channel, both wired or wireless. Such instructions may comprise code from any suitable computer programming language including, without limitation, C, C++, C#, Visual Basic, Java, Python, Perl, and JavaScript.

It is to be further understood that client devices that may be employed by embodiments of the invention may also comprise a number of external or internal devices, such as a mouse, a CD-ROM, DVD, keyboard, display, or other input or output devices. In general such client devices may be any suitable type of processor-based platform that is connected to a network and that interacts with one or more application programs and may operate on any suitable operating system. Server devices may also be coupled to the network and, similarly to client devices, such server devices may comprise a processor coupled to a computer-readable medium, such as a random access memory (RAM). Such server devices, which may be a single computer system, may also be implemented as a network of computer processors. Examples of such server devices are servers, mainframe computers, networked computers, a processor-based device, and similar types of systems and devices.

What is claimed is:

1. A method, comprising:
    representing, by one or more processors, a plurality of replication servers of a replication topology as replication update suppliers in rows of a first binary matrix and as replication update receivers in columns of the first binary matrix;
    generating, using the processor, a result matrix based at least in part on the first binary matrix;
    identifying, using the processor, any replication servers of the replication topology represented as replication update receivers in columns of the first binary matrix that are not enabled to receive updates from at least one of said replication servers of the replication topology represented as replication update suppliers in rows of the first binary matrix based at least in part on the result matrix; and
    generating, using the processor, a non-enabled replication server warning for any replication servers of the replication topology represented as replication update receivers in columns of the first binary matrix that are not enabled to receive updates from at least one of said replication servers of the replication topology represented as replication update suppliers in rows of the first binary matrix based at least in part on the result matrix.

2. The method of claim 1, wherein the first binary matrix further comprises a plurality of cells defined by the respective rows and columns of the first binary matrix, and wherein a cell value of one represents a connection between a replication server represented as a replication update supplier in a row and a replication server represented as a replication update receiver in a column that together define the cell.

3. The method of claim 1, wherein representing the plurality of replication servers further comprises representing the plurality of replication servers of the replication topology in the first binary matrix of a size N×N, where N is a number of replication servers in the replication topology.

4. The method of claim 1, wherein the plurality of replication servers further comprises a plurality of servers of a server infrastructure.

5. The method of claim 4, wherein the plurality of servers further comprises a plurality of servers of a Lightweight Directory Access Protocol (LDAP) infrastructure.

6. The method of claim 1, wherein generating the result matrix further comprises generating the result matrix as a product of a one-row binary matrix representing one of the plurality of replication servers of the replication topology as a replication update supplier and the first binary matrix.

7. The method of claim 6, wherein generating the result matrix further comprises generating the result matrix according to an equation: $M_{Result}=M_{Row}*M$, where $M_{Result}$ is the result matrix, $M_{Row}$ is the one-row binary matrix representing one of the plurality of replication servers of the replication topology as a replication update supplier, and M is the first binary matrix.

8. The method of claim 7, wherein the result matrix comprises a one-row result matrix.

9. The method of claim 1, wherein generating the result matrix further comprises generating the result matrix as a product of the first binary matrix multiplied by itself.

10. The method of claim 9, wherein generating the result matrix further comprises generating the result matrix according to an equation: $M_{Result}=M*M$, where $M_{Result}$ is the result matrix and M is the first binary matrix.

11. The method of claim 10, wherein the first binary matrix comprises a binary matrix of size N×N, where N is a number of replication servers in the replication topology, and the result matrix is likewise a matrix of size N×N.

12. The method of claim 1, wherein generating the result matrix further comprises generating the result matrix by multiplying the first binary matrix by itself and iteratively multiplying the first binary matrix by an outcome matrix and by each of a plurality of succeeding outcome binary matrices for a pre-determined number of iterations.

13. The method of claim 12, wherein the result matrix comprises a matrix of size N×N, where N is a number of replication servers in the replication topology.

14. The method of claim 13, wherein generating the result matrix further comprises iteratively multiplying the first binary matrix by the outcome matrix and by each of the plurality of succeeding outcome binary matrices for a pre-determined number of iterations equal to N minus two iterations.

15. The method of claim 1, wherein identifying any replication servers of the replication topology represented as replication update receivers in columns of the first binary matrix that are not enabled to receive updates from at least one of said replication servers of the replication topology represented as replication update suppliers in rows of the first binary matrix further comprises identifying cells defined by respective rows of the result matrix representing the plurality of replication servers as replication update suppliers and columns of the result matrix representing the plurality of replication servers as replication update receivers having cell values equal to zero.

16. The method of claim 15, further comprising identifying replication servers of the replication topology represented as replication update receivers that are enabled to receive updates from at least one of said replication servers of the replication topology represented as replication update suppliers as cells defined by respective rows of the result matrix representing the plurality of replication servers as replication update suppliers and columns of the result matrix representing the plurality of replication servers as replication update receivers having cell values equal to one.

17. A system, comprising:
    one or more processors coupled to memory and programmed to:
        represent a plurality of replication servers of a replication topology as replication update suppliers in rows of a first binary matrix and as replication update receivers in columns of the first binary matrix;
        generate a result matrix based at least in part on the first binary matrix;
        identify any replication servers of the replication topology represented as replication update receivers in columns of the first binary matrix that are not enabled to receive updates from at least one of said replication servers of the replication topology represented as replication update suppliers in rows of the first binary matrix based at least in part on the result matrix; and
        generate a non-enabled replication server warning for any replication servers of the replication topology represented as replication update receivers in columns of the first binary matrix that are not enabled to receive updates from at least one of said replication servers of the replication topology represented as replication update suppliers in rows of the first binary matrix based at least in part on the result matrix.

* * * * *